Aug. 25, 1953 W. E. MARTIN 2,650,089
SPRING SHACKLE
Filed May 24, 1949 3 Sheets-Sheet 1

INVENTOR.
William E. Martin
BY
Eberhard E. Wettley
Atty.

Aug. 25, 1953  W. E. MARTIN  2,650,089
SPRING SHACKLE
Filed May 24, 1949  3 Sheets-Sheet 2
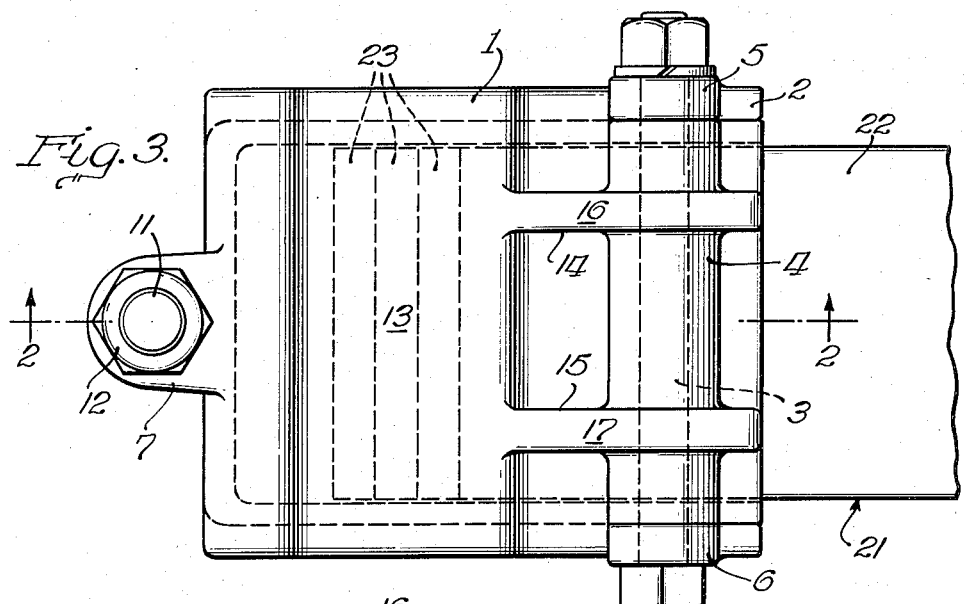
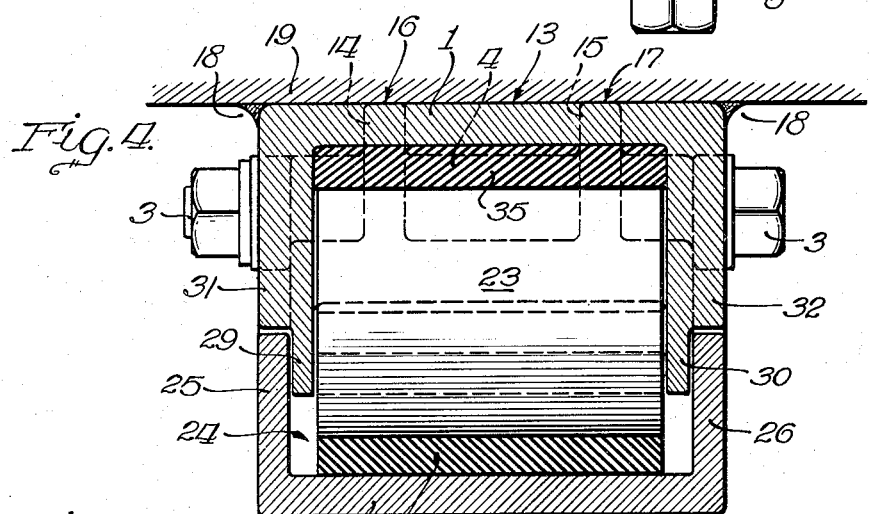
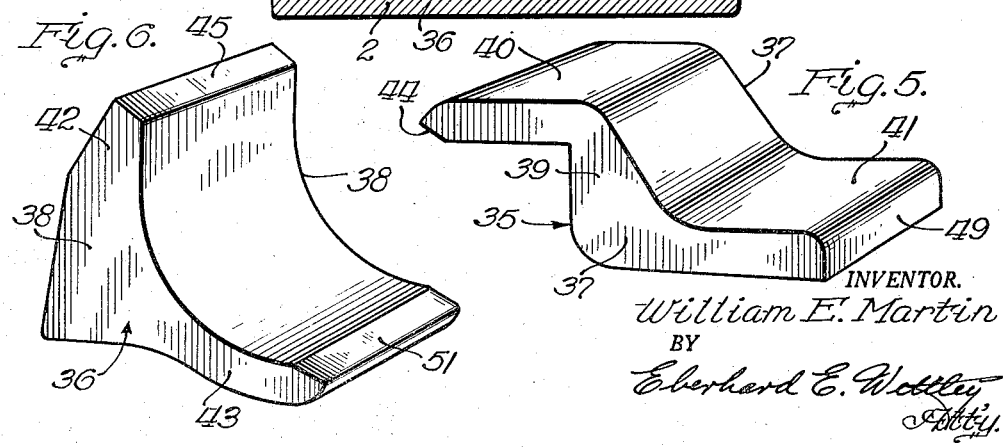
INVENTOR.
William E. Martin
BY
Eberhard E. Wettley
Atty.

Aug. 25, 1953  W. E. MARTIN  2,650,089
SPRING SHACKLE

Filed May 24, 1949  3 Sheets-Sheet 3

INVENTOR.
William E. Martin
BY
Eberhard E. Wetley
Atty.

Patented Aug. 25, 1953

2,650,089

UNITED STATES PATENT OFFICE 2,650,089

SPRING SHACKLE

William E. Martin, Kewanee, Ill.

Application May 24, 1949, Serial No. 95,069

12 Claims. (Cl. 267—30)

This invention relates to vehicle mountings for the ends of vehicle springs and is more specifically directed to a replaceable rubber lined spring shackle adapted for anchoring and cushioning the spring end.

One of the main objects of the device of this invention is to provide a sturdy and low cost compact unit which will resiliently anchor a spring end to a vehicle body through the use of a housing having replaceable rubber blocks.

Another object of the shackle devised is to provide a separable housing comprising two relatively pivoted complementary parts which confine the end of the spring therein between coacting rubber blocks carried by said parts.

The shackle is designed to receive a spring having an upturned end with the rubber blocks shaped and arranged to surround a greater portion of the connected spring end in the normal flexing plane of the spring. In combination with this feature the shackle is designed for metal to metal contact with the lateral edges of the upturned spring end to counteract weaving, twisting or side sway of the spring end under operative conditions. Thus the spring is fully anchored in rubber which flexibly restrains spring movements in a vertical plane whether fore and aft, vertically, or in other directions in the same flexing plane, while the spring end is laterally guided and maintained for operation in said vertical active plane by the side contacting arrangement of the rubber holding shackle housing parts.

The separable shackle parts embody the feature of permitting opening the shackle housing for inspection or replacement of the rubber blocks that anchor and hold the upturned spring end within the mounting unit. The shackle can be readily disassembled for a more complete inspection or for the removal of the vehicle spring under certain conditions which include the situation where an entirely new spring is to be installed in place of the old one.

Other objects and advantages relating to the rubber spring shackle of this invention shall hereinafter appear in the following detailed description thereof having reference to the accompanying drawings forming a part of this specification.

In the drawings:

Fig. 3 is a plan view of the shackle as viewed substantially along the line 3—3 in Fig. 1 with the vehicle body entirely omitted;

Fig. 4 is a transverse vertical cross sectional view through the shackle structure taken substantially along the line 4—4 in Fig. 2;

Figs. 5 and 6 are perspective views of the resilient mounting blocks carried in the shackle and which coact to anchor the spring within the shackle;

Figure 1:
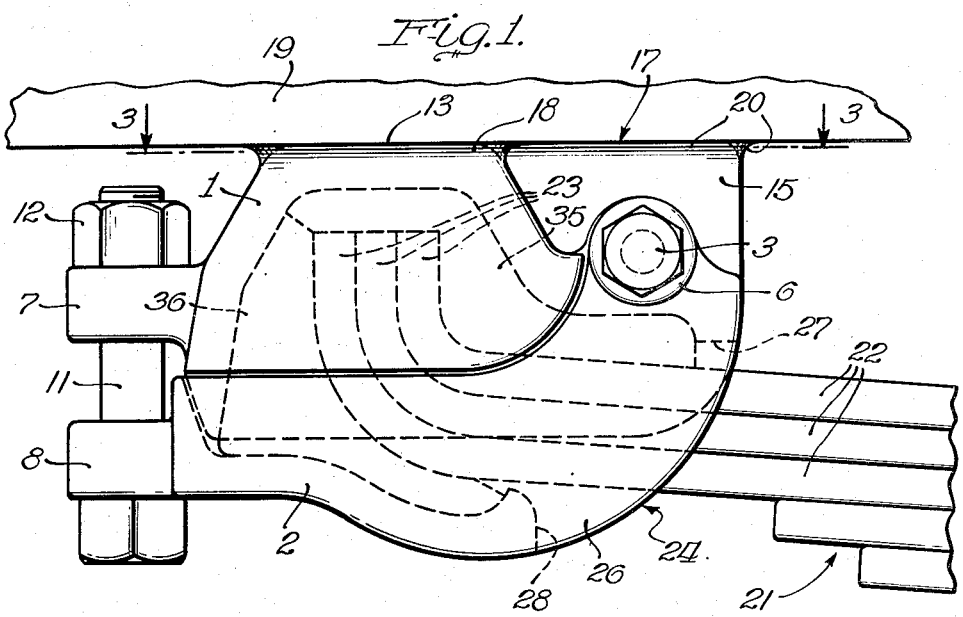
Fig. 1 is a side elevational view of the spring mounting shackle of this invention as the same would appear when connected with a vehicle and confining the end of a vehicle spring therein to secure the spring to the vehicle; with only fragmentary portions of the vehicle and spring being here indicated.

The shackle illustrated in Figs. 1 to 6 has a two piece housing comprising a mounting socket 1 and a cap 2 pivotally joined by means of a pivot bolt 3 passing through the supporting boss 4 on the socket and through the two ears 5 and 6 on the cap 2 which ears straddle the socket as best shown in Figs. 1, 3, and 4. A pair of lugs 7 and 8 are connected centrally with the socket 1 and cap 2 and these lugs have openings 9 and 10 for the reception of a bolt 11 which carries a nut 12 for drawing the two complementary housing sections 1 and 2 together.

Figure 2:
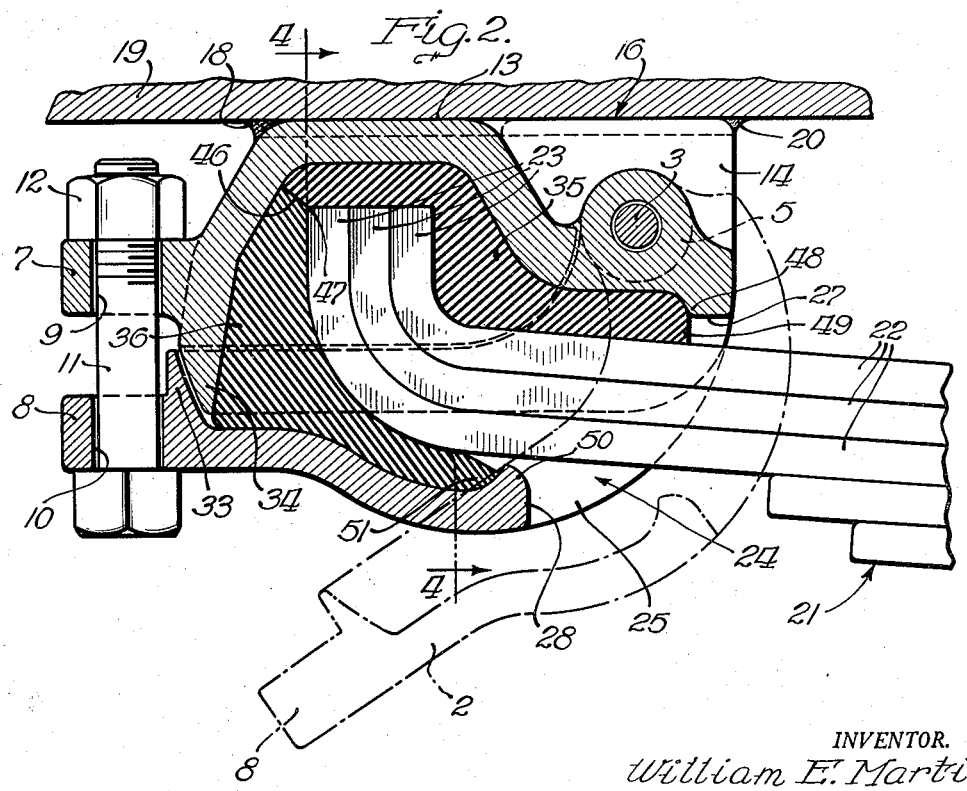
Fig. 2 is a vertical cross sectional view of the shackle taken substantially along the line 2—2 in Fig. 3 and longitudinally of the shackle in the general vertical flexing plane of the spring to show the coaction of the complementary parts of the shackle.

The mounting socket 1 is made with a flat top 13 continuing in a pair of reenforcing ribs 14 and 15 that have upper surfaces 16 and 17 which remain flush with the plane of the top 13 of the socket. The ribs traverse the boss 4 and continue to the end of the socket casting as best shown in Figs. 1, 2 and 3. The socket 1 is welded at 18 to the vehicle body 19, the welding continuing about the ribs at 20 to rigidly secure the entire shackle in fixed position to the underside of the body 19 of the vehicle.

The vehicle spring 21 is of the usual leaf type of construction but this spring has its upper spring leaves 22 continuing into the shackle housing and terminating with upturned ends 23 pointing into the cavity of the shackle socket 1. An entrance opening 24 for the spring is provided laterally between the side walls 25 and 26 of the cap 2 and vertically between the terminal ends 27 and 28 of the socket 1 and cap 2 respectively.

As best seen in Figs. 2 and 4, lateral stability is added to the two piece shackle mounting by providing skirts 29 and 30 on the side walls 31 and 32 of the socket 1 to overlappingly engage within the side walls 25 and 26 of the cap 2. The swingable end of the cap 2 is made with an end lip 33 as a continuation of the walls 25 and 26 for the overlapping reception of a coacting lip 34 on the socket 1, lip 34 being a continuation of the side wall skirts 29 and 30 of the socket 1.

The interior chamber of the two piece housing comprising the socket 1 and the cap 2 is filled with a pair of resilient blocks 35 and 36 individually shown in Figs. 5 and 6. These blocks 35 and 36 are preferably of rubber and have flat side edges 37 and 38 respectively and the blocks extend from wall to wall within the shackle housing. Block 35 form fits the concave portion of the spring ends 23 and has a vertical leg 39 to absorb load shocks in the direction of the housing pivot, and block 35 has horizontal legs 40 and 41 to absorb upward load shocks by the spring. Block 38 form fits the convex portion of the spring ends 23 and has a vertical leg 42 to absorb load shocks in the direction away from pivot 3 and a horizontal leg 43 to absorb vertical load shocks on the side beneath the encased spring end. The outer end of the leg 40 and the upper end of the leg 42 of the blocks 35 and 36 have coacting terminal surfaces 44 and 45 which abut within the housing to form a parting line 46 diagonally positioned with respect to the outermost spring corner 47 to permit separation of the shackle parts and the spring without interference.

In addition, socket 1 has a lip 48 adjacent the terminal end 27 to abut and hold the end 49 of block 35, while the cap 2 has a lip 50 adjacent the terminal end 28 to restrain the end 51 of block 36 whereby the blocks are held against spreading or expanding into the spring opening of the housing.

The spring 21 is of a width to fit into the housing with a substantial wall to wall contact as best seen in Figs. 3 and 4, and through the use of upturned spring leaf ends 23, twisting of the spring end or weaving is counteracted by this lateral metal to metal contact. The rubber blocks 35 and 36 are for the greater part carried in the socket 1 of the housing and they are held in place therein by the cap 2 which acts against the leg 43 of the block 36 to exert pressure against the two blocks and the confined spring end as brought about by the bolt 11 and its nut 12.

By removing the bolt 11, the cap 2 can be swung about its pivotal pin 3 into a position such as shown in the dot and dash lines in Fig. 2 for inspecting the rubber blocks or the spring end and to replace worn blocks if necessary. If removal of the spring is required, the pivot bolt 3 can be taken out to free the cap 2 from the socket 1 thus permitting easy withdrawal of the spring from within the socket.

This shackle provides a quiet spring mounting with all the freedom needed for its efficient operation, and no oiling or greasing of the parts is necessary to maintain the same for functioning of their designed capacities.

Figure 7:
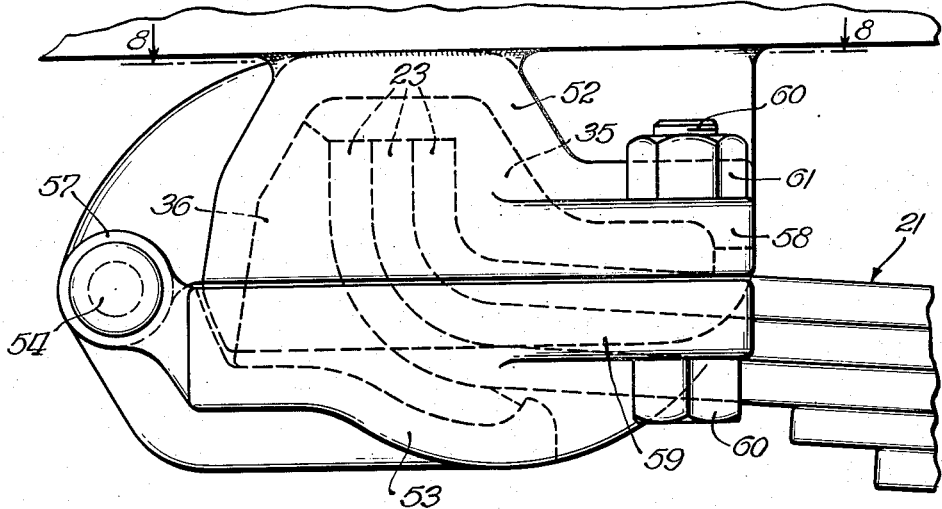
Fig. 7 is a side elevational view of a modified construction of shackle.
Figure 8:
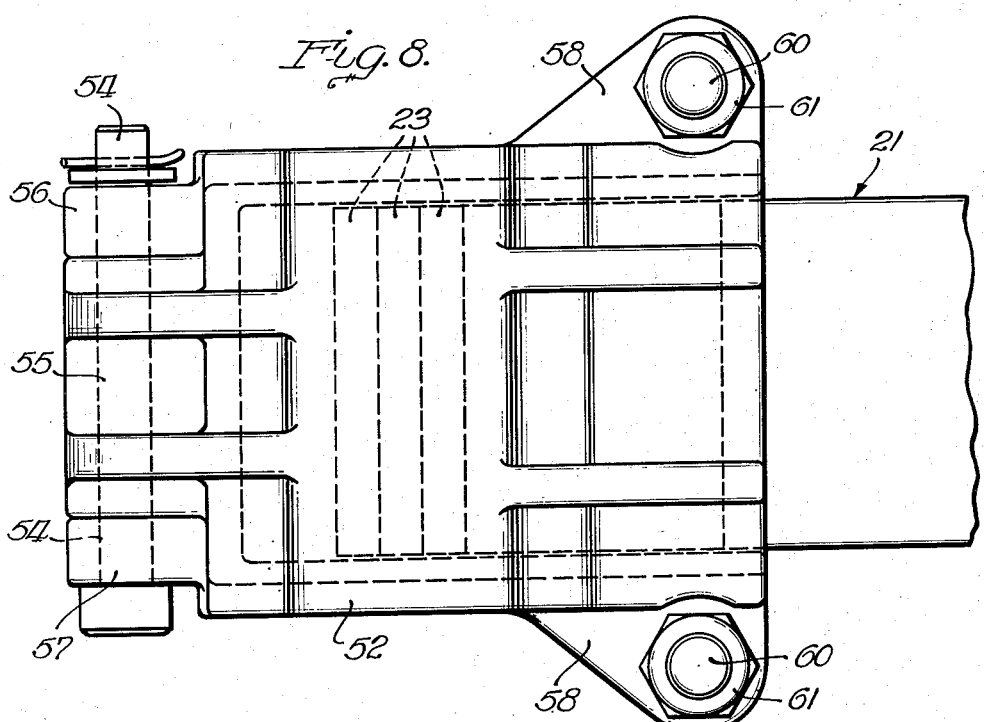
Fig. 8 is a plan view of the modified shackle as viewed along the line 8—8 in Fig. 7, the vehicle body being omitted.

Figs. 7 and 8 show a shackle of the same type but here the pivotal connection has been brought to the side away from the end of the spring with the bolting mechanism at the spring side but laterally thereof. This shackle utilizes a socket 52, a cap 53, and a pivot bolt 54 extending through a socket boss 55 and ears 56 and 57 on the cap 53. A pair of apertured lugs 58 on the socket 52 are aligned with a similar pair of apertured lugs 59 carried by cap 53 for the reception of the bolts 60 carrying nuts 61 to draw the two housing parts together against blocks 35 and 36 sandwiching the spring end leaves 23 therebetween. As seen in Fig. 8, the bolt lugs 58 and 59 extend laterally outwardly from the housing parts to avoid the zone of operation of the flexing spring.

In the latter shackle structure, the cap need not be disassembled from the socket structure even when a spring replacement is necessary, but in other respects the shackle has the same spring mounting features as in the first described form of shackle.

Although the description has been directed to the preferred constructions of shackles disclosed in the drawings, certain changes and deviations are contemplated in these structures without departing from the fundamental concept of the invention. The extent of such modifications shall, however, be governed by the breadth and scope of the appended claims directed to the resilient shackle of this invention.

What I claim is:

1. A vehicle spring shackle comprising a two piece housing, operable hinge means to join said housing pieces together and to allow separation thereof about a predetermined axis, a vehicle spring having an upturned end to nest within said housing pieces, and coacting resilient members carried by the two housing pieces to snugly confine the upturned spring end within said housing, and clamp means cooperating with said operable hinge means to keep the two housing pieces together to hold said resilient members in place about said spring end, said housing pieces being separable about said hinge means axis upon release of said clamp means to allow withdrawal of the upturned spring end from said housing pieces and from the associated resilient members.

2. A shackle to resiliently connect a vehicle spring with the body of a vehicle comprising a housing connected with the vehicle, said vehicle spring having a curved end for disposition within said housing, and said housing having pivotally connected parts to confine the end of said spring therein, said parts including resilient blocks shaped to form fit the curved spring end to resiliently hold said spring end within said housing, and releasable clamping means to hold said blocks and housing parts in operative spring holding relaion, said blocks each comprising individual coacting members disposed at opposite faces of the curved end of said spring with surface portions of said blocks positioned in contiguously abutting contact along a parting plane arranged in predetermined relation with respect to the spring end to allow bodily removal of said blocks from said spring end and from within said housing to release said spring from said housing.

3. A spring mounting to fasten the end of a vehicle spring to the body of a vehicle comprising a housing having a socket secured to the vehicle, a vehicle spring having an upturned end disposed in angular relation with respect to the length of the spring and extending outwardly from one face thereof for projecting into the socket, said housing having a closure cap pivotally carried by said socket, and releasable clamp means to hold said cap and socket together, said cap and socket having individual resilient blocks therein disposed in the flexing plane of said spring, and said blocks being shaped to surround the upturned end of said spring and adapted to cushion the flexing actions of the spring relative to the housing.

4. A mounting to secure a spring with an upturned end to a vehicle body comprising, in combination, a spring having an angularly projecting terminal end with flat parallel sides, a housing connected with said vehicle body, a cap pivotally connected with said housing, said housing and cap having openings therein to receive the spring therethrough, and a clamp to hold said cap and housing together, said housing and cap having interfitting and overlapping parts to stabilize the structure, and said housing having coacting rubber blocks therein to surround the angularly projecting end of the spring in the flexing plane thereof to cushion the action of said spring, and said interfitting and overlapping parts including parallel spaced wall portions to flank the opposite adjacent flat sides of said angular spring end and the side portions of said associated rubber blocks to confine said spring end and blocks for operation in said flexing plane of the spring.

5. A mounting to attach a spring with a curved end to the body of a vehicle comprising a pair of pivotally connected housing members, one of said members being secured to said body and at least one of said members having a chamber of spring width to face contact the lateral sides of the spring and its curved end, and a plurality of resilient blocks carried within said housing members to nest about the curved end of the spring in the normal flexing plane of the spring, and compression means to hold said housing members and said confined blocks in spring holding relation.

6. A mounting to attach a spring with a curved end to the body of a vehicle comprising a pair of pivotally connected housing members, one of said members being secured to said body and at least one of said members having a chamber of spring width to face contact the lateral sides of the spring and its curved end, and a plurality of resilient blocks carried within said housing members to nest about the curved end of the spring in the normal flexing plane of the spring, and compression means to hold said housing members and said confined blocks in spring holding relation, said compression means being disposed to one side of the curved terminal end of said spring, and said pivotally connected housings having pivotal means disposed to the opposite side of the terminal end of said spring.

7. A vehicle spring having an upturned end and a mounting unit to attach said spring end to a vehicle body comprising a housing of spring width to stabilize the spring for flexing in its normal vertical plane of operation, and resilient blocks carried within said housing and about the upturned curved end of said spring, one of said blocks having a configuration to counteract withdrawal of said curved spring end from said housing and to cushion upward flexing spring loads within said housing, and the other of said blocks having a configuration to oppose spring motion into said housing and to cushion downward flexing spring loads within said housing.

8. A vehicle spring having an upturned end and a mounting unit to attach said spring end to a vehicle body comprising a housing of spring width to stabilize the spring for flexing in its normal vertical plane of operation, and resilient blocks carried within said housing and about the upturned curved end of said spring, one of said blocks having a configuration to counteract withdrawal of said curved spring end from said housing and to cushion upward flexing spring loads within said housing, and the other of said blocks having a configuration to oppose spring motion into said housing and to cushion downward flexing spring loads within said housing, said housing being divided lengthwise of the spring, and pivotal means connecting said divided housing parts having cooperative clamping means to prevent relative rotation of said divided parts about said pivotal means.

9. A spring shackle to attach a spring to a vehicle comprising a first hollow spring holding housing part connected with the vehicle, a second hollow spring holding housing part, operable means separably connecting said housing parts for the reception of the spring, a vehicle spring having its terminal end bent angularly with respect to the length of the spring and for disposition within said housing parts, at least one of said housing parts having parallel interior walls spaced for contact with opposite sides of the spring end, and said spring and its bent terminal end presenting coplanar parallel side walls for directly coacting with the parallel interior walls of said one housing part to counteract bodily twisting of said spring end and spring in relation to the housing parts.

10. A spring shackle to attach a spring to a vehicle comprising a first hollow spring holding housing part connected with the vehicle, a second hollow spring holding housing part, operable means separably connecting said housing parts for the reception of the spring, a vehicle spring having its terminal end bent angularly with respect to the length of the spring and for disposition within said housing parts, at least one of said housing parts having parallel interior walls separated by the width of the spring end, and said spring and its bent terminal end providing coplanar parallel side walls for directly coacting with the parallel interior walls of said one housing part to counteract bodily twisting of said spring end and the spring in relation to the housing parts, and individual resilient spring width blocks interposed between portions of said spring end and said housing parts to resiliently confine said spring end within said parts.

11. A spring shackle to attach a spring to a vehicle comprising a first hollow spring holding housing part connected with the vehicle, a second hollow spring holding housing part, operable means separably connecting said housing parts for the reception of the spring, a vehicle spring having a deformed end for disposition within said housing parts, at least one of said housing parts having parallel interior walls spaced for contact with opposite sides of the spring end, and said spring and its deformed end terminating in coplanar parallel side walls disposed adjacent to and coacting with the parallel interior walls of said one housing part to counteract bodily twisting of said spring end and the spring in relation to the housing parts, and resilient blocks interposed between portions of said spring end and said housing parts to resiliently confine said spring end within said parts, said blocks conforming with the shape of the spring end and terminating in flat parallel sides adjacent the interior walls of said one housing part to retain said blocks in operative relation with respect to said housing parts and the spring end.

12. A spring shackle to attach a vehicle spring to a vehicle comprising a socket member secured to said vehicle, said socket having a chamber therein to receive the end portion of the spring therein, a cap to surround the end portion of said spring below said socket member, said cap having spring flanking ears thereon connected with said socket member and arranged to swing said cap relatively to said member and about an axis located in a position longitudinally inwardly with respect to the end portion of said spring, said cap having an opening communicating with said socket member chamber with said opening being arranged to receive the end portion of said vehicle spring therethrough, and fastening means to hold said cap and socket member together and about the end portion of said spring, said cap and socket member having coacting means to tightly clamp the end portion of said spring therebetween, and said cap comprising means to automatically swing into a position beneath said end portion of said spring whereby to retain said spring end portion in a position adjacent said vehicle socket member upon accidental failure or release of said cap holding fastening means.

WILLIAM E. MARTIN.

References Cited in the file of this patent

UNITED STATES PATENTS

| Number | Name | Date |
|---|---|---|
| 1,714,130 | Lipcot | May 21, 1929 |
| 1,748,747 | Alden et al. | Feb. 25, 1930 |
| 1,792,038 | Rossi | Feb. 10, 1931 |
| 1,792,070 | Chilton | Feb. 10, 1931 |
| 2,407,236 | Heiney | Sept. 10, 1946 |

FOREIGN PATENTS

| Number | Country | Date |
|---|---|---|
| 291,686 | Great Britain | June 7, 1928 |
| 503,874 | Germany | July 28, 1930 |